United States Patent Office 3,164,622
Patented Jan. 5, 1965

3,164,622
COMPOUNDS CONTAINING SILICON AND PHOSPHORUS
Michael John Newlands, Romiley, England, assignor to Philadelphia Quartz Company, Philadelphia, Pa., a corporation of Pennsylvania
No Drawing. Filed Mar. 10, 1961, Ser. No. 94,668
Claims priority, application Great Britain, Mar. 17, 1960, 9,537/60
4 Claims. (Cl. 260—448.2)

This invention relates to organic compounds containing silicon and phosphorus and more particularly to those containing a silicon atom directly linked to a quinquevalent phosphorus atom.

The invention provides a process for preparing such compounds comprising reacting a silyllithium compound with a di-ester of a halogenophosphonic acid of the formula

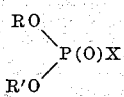

with the elimination of lithium chloride, where R and R', which may be the same or different, each represent an alkyl group with 1 to 20 carbon atoms, for example methyl, ethyl or butyl groups, a cycloalkyl group with 5 or 6 carbon atoms, an aryl group such as phenyl, or an aralkyl group such as benzyl, and X is a halogen atom, for example a chlorine or bromine atom.

Thus compounds of the general formula

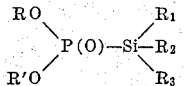

where R and R' have the above meanings and $R_1$, $R_2$ and $R_3$, which may be the same or different, represent hydrogen, an alkyl group with 1 to 20 carbon atoms, for example methyl, ethyl or butyl groups, a cycloalkyl group with 5 or 6 carbon atoms; an aryl group such as phenyl, or an aralkyl group such as benzyl, can be prepared by reacting a compound of the formula

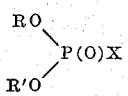

X being a halogen atom, with a compound of the formula

The reaction is suitably carried out in anhydrous tetrahydrofuran, but other anhydrous solvents such as petroleum fractions, benzene, xylene, toluene, 1,2-dimethoxyethane and di-ethylene glycol dimethyl ether may also be used.

Thus dibenzyl triphenylsilylphosphonate

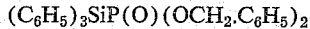

may be prepared by reacting triphenylsilyllithium with dibenzyl phosphorochloridate $ClP(O)(OCH_2.C_6H_5)_2$. This silicon-phosphorus compound has a melting point of 222° C., is stable to air and is stable to 10% aqueous sodium hydroxide.

Silicon-phosphorus compounds possessing a direct bond between a silicon atom and a quinquevalent phosphorus atom and having an aryl group bound to the silicon atom have not been prepared hitherto and the present invention, in one aspect, provides such novel compounds which can be represented by the general formula

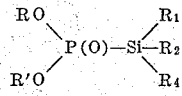

where R, R', $R_1$ and $R_2$ have the above meanings, and $R_4$ is an aryl group. As examples of such compounds may be mentioned those in which $R_1$, $R_2$ and $R_4$ each represent an aryl group.

These silicon-phosphorus compounds possessing an aryl group directly linked to the silicon atom can be prepared by the above described process of the invention. It has been found, however, that they may also be prepared by the following novel process. Thus the new compounds can also be prepared by a process which comprises reacting compound of the formula

where R and R' have the above meanings and M represents lithium, sodium or potassium, with a compound of the formula

where $R_1$, $R_2$, $R_4$ and X have the above meanings, the reaction being carried out in a solvent selected from the group consisting of ethers of diethyleneglycol, such as diethyleneglycol dimethyl ether, tetrahydropyran, tetrahydrofuran and hydrocarbons or hydrocarbon mixtures, such as xylene or light petroleum fractions.

Thus, for example, dibenzyl triphenylsilylphosphonate $(C_6H_5)_3SiP(O)(OCH_2.C_6H_5)_2$ can be prepared by reacting triphenylchlorosilane $(C_6H_5)_3SiCl$ with the sodioderivative of dibenzylphosphonate $(C_6H_5.CH_2O)_2P(O)Na$ in tetrahydrofuran, light petroleum or xylene.

The compounds obtained in accordance with the invention have a number of uses. They may for example be employed as oil additives, as hydraulic fluids and as viscosity improvers for higher alkyl silicates; for the last of these uses dibenzyl triphenylsilylphosphonate is especially suitable. Those compounds which are rapidly hydrolysed by water find application in the binding of refractory powders in the manufacture of moulds for the casting of metals.

The following examples illustrate the invention.

*Example 1*

Triphenylsilyl lithium $(C_6H_5)_3SiLi$ in tetrahydrofuran was made from 14.7 g. (0.05 mole) of triphenylchlorosilane $(C_6H_5)_3SiCl$ by the method of Gilman Peterson and Wittenberg (Chemistry and Industry, 1479 [1958]). This solution was filtered and added dropwise with stirring to a solution of dibenzyl phosphorochloridate

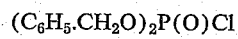

in benzene. The reaction was carried out in an atmosphere of nitrogen with rigorous exclusion of moisture. The mixture was stirred for 3 hours, allowed to stand for 36 hours and then filtered. The residue was extracted with benzene in a Soxhlet apparatus. Concentration of the benzene solution led to the deposition of crystals of dibenzyl triphenylsilylphosphonate (2.6 g.; 10%) M.P. 220–222° C.

*Example 2*

The sodio-derivative of dibenzyl phosphite was prepared from 13.1 g. of dibenzyl phosphite and 1.15 g. of sodium shot in xylene. Triphenylchlorosilane (14.7 g.) in xylene was added dropwise to the stirred solution of the sodio-derivative. The temperature was then raised to the boiling point of xylene and the mixture refluxed with stirring for about 15 hours.

The precipitated sodium chloride was filtered off and the filtrate evaporated to minimum bulk. Ether was added to the sticky brown gum when white crystals separated. The crystals were filtered off and the filtrate evaporated and again treated with ether. In this way a total of 4.04 g. (31%) of dibenzyl triphenylsilylphosphonate was recovered, M.P. 220-222° C.

What is claimed is:
1. Compounds of the general formula:

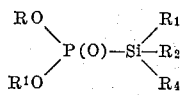

wherein R, R$^1$, R$_1$, R$_2$ and R$_4$ are aryl groups.

2. Dibenzyl triphenylsilylphosphonate.
3. A process for preparing compounds of the general formula

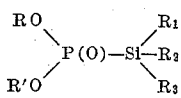

where R and R' are groups selected from the class consisting of alkyl groups having 1 to 20 carbon atoms, cycloalkyl groups having 5 and 6 carbon atoms, aryl groups and aralkyl groups, where R$_1$, R$_2$ and R$_3$ are selected from the class consisting of hydrogen, alkyl groups having 1 to 20 carbon atoms, cycloalkyl groups having 5 and 6 carbon atoms, aryl groups and aralkyl groups, comprising reacting a compound of the formula

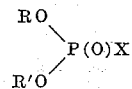

with a compound of the formula

wherein X is a halogen atom and R, R', R$_1$, R$_2$, and R$_3$ have the meanings set forth above.

4. A process for preparing dibenzyl triphenylsilylphosphonate which comprises reacting triphenylsilyl lithium in a tetrahydrofuran solvent with a solution of dibenzyl phosphorochloridate in benzene.

References Cited in the file of this patent
UNITED STATES PATENTS

| | | |
|---|---|---|
| 2,515,024 | Trautman | July 11, 1950 |
| 2,920,094 | Fekete | Jan. 5, 1960 |

FOREIGN PATENTS

| | | |
|---|---|---|
| 124,439 | Russia | Mar. 31, 1959 |

OTHER REFERENCES

Arbuzov et al.: "Doklady Akad. SSSR," vol, 59 (1948) pages 1433-5 (translation available in Gr. 110, "Organo-silicon Literature," vol. 5, pages 116-120).

Keeber et al.: "Journal Organic Chemistry," vol. 21, No. 5, May 1956, pages 509-13.

Feher et al.: "Berichte der Deutschen Chem. Gesellschaft," vol. 90 (1957), pages 134-44.

Newlands: "Proceedings of the Chemical Society," London, March 1960, page 123.